United States Patent
Hart et al.

(10) Patent No.: US 9,460,715 B2
(45) Date of Patent: *Oct. 4, 2016

(54) IDENTIFICATION USING AUDIO SIGNATURES AND ADDITIONAL CHARACTERISTICS

(71) Applicant: Amazon Technologies, Inc., Reno, NV (US)

(72) Inventors: Gregory Michael Hart, Mercer Island, WA (US); Scott Ian Blanksteen, Issaquah, WA (US); Stephen Frederick Potter, Seattle, WA (US); William Folwell Barton, Harvard, MA (US)

(73) Assignee: Amazon Technologies, Inc., Seattle, WA (US)

( * ) Notice: Subject to any disclaimer, the term of this patent is extended or adjusted under 35 U.S.C. 154(b) by 135 days.

This patent is subject to a terminal disclaimer.

(21) Appl. No.: 13/784,616

(22) Filed: Mar. 4, 2013

(65) Prior Publication Data

US 2014/0249817 A1    Sep. 4, 2014

(51) Int. Cl.
*G10L 15/00* (2013.01)
*G10L 15/22* (2006.01)

(52) U.S. Cl.
CPC .......... *G10L 15/22* (2013.01); *G10L 2015/223* (2013.01)

(58) Field of Classification Search
None
See application file for complete search history.

(56) References Cited

U.S. PATENT DOCUMENTS 5,583,965 A * 12/1996 Douma ............... G10L 15/26 704/246
6,466,847 B1 * 10/2002 Horst ........................... 701/2
7,418,392 B1   8/2008 Mozer et al.

(Continued)

FOREIGN PATENT DOCUMENTS

WO   WO2011088053   7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

(Continued)

*Primary Examiner* — Vincent Rudolph
*Assistant Examiner* — Richa Mishra
(74) *Attorney, Agent, or Firm* — Lee & Hayes, PLLC

(57) ABSTRACT

Techniques for using both speaker-identification information and other characteristics associated with received voice commands to determine how and whether to respond to the received voice commands. A user may interact with a device through speech by providing voice commands. After beginning an interaction with the user, the device may detect subsequent speech, which may originate from the user, from another user, or from another source. The device may then use speaker-identification information and other characteristics associated with the speech to attempt to determine whether or not the user interacting with the device uttered the speech. The device may then interpret the speech as a valid voice command and may perform a corresponding operation in response to determining that the user did indeed utter the speech. If the device determines that the user did not utter the speech, however, then the device may refrain from taking action on the speech.

23 Claims, 6 Drawing Sheets

(56) References Cited

U.S. PATENT DOCUMENTS

| | | | |
|---|---|---|---|
| 7,720,683 B1 | 5/2010 | Vermeulen et al. | |
| 7,774,204 B2 | 8/2010 | Mozer et al. | |
| 2004/0128131 A1* | 7/2004 | Campbell | G10L 17/06 704/247 |
| 2004/0193425 A1* | 9/2004 | Tomes | 704/273 |
| 2005/0063522 A1* | 3/2005 | Kim et al. | 379/88.02 |
| 2007/0094021 A1* | 4/2007 | Bossemeyer, Jr. | G10L 17/22 704/249 |
| 2008/0071536 A1* | 3/2008 | Nagashima | 704/246 |
| 2010/0158207 A1* | 6/2010 | Dhawan | G10L 17/22 379/88.02 |
| 2011/0131042 A1* | 6/2011 | Nagatomo | 704/240 |
| 2011/0173001 A1* | 7/2011 | Guy, III | G06F 17/2276 704/246 |
| 2011/0307253 A1* | 12/2011 | Lloyd | G10L 15/20 704/233 |
| 2012/0223885 A1 | 9/2012 | Perez | |

OTHER PUBLICATIONS

PCT Search Report and Written Opinion mailed Jul. 10, 2014 for PCT Application No. PCT/US14/19092, 8 Pages.

* cited by examiner

IDENTIFICATION USING AUDIO SIGNATURES AND ADDITIONAL CHARACTERISTICS

BACKGROUND

Homes are becoming more wired and connected with the proliferation of computing devices such as desktops, tablets, entertainment systems, and portable communication devices. As computing devices evolve, many different ways have been introduced to allow users to interact with these devices, such as through mechanical means (e.g., keyboards, mice, etc.), touch screens, motion, and gesture. Another way to interact with computing devices is through speech.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
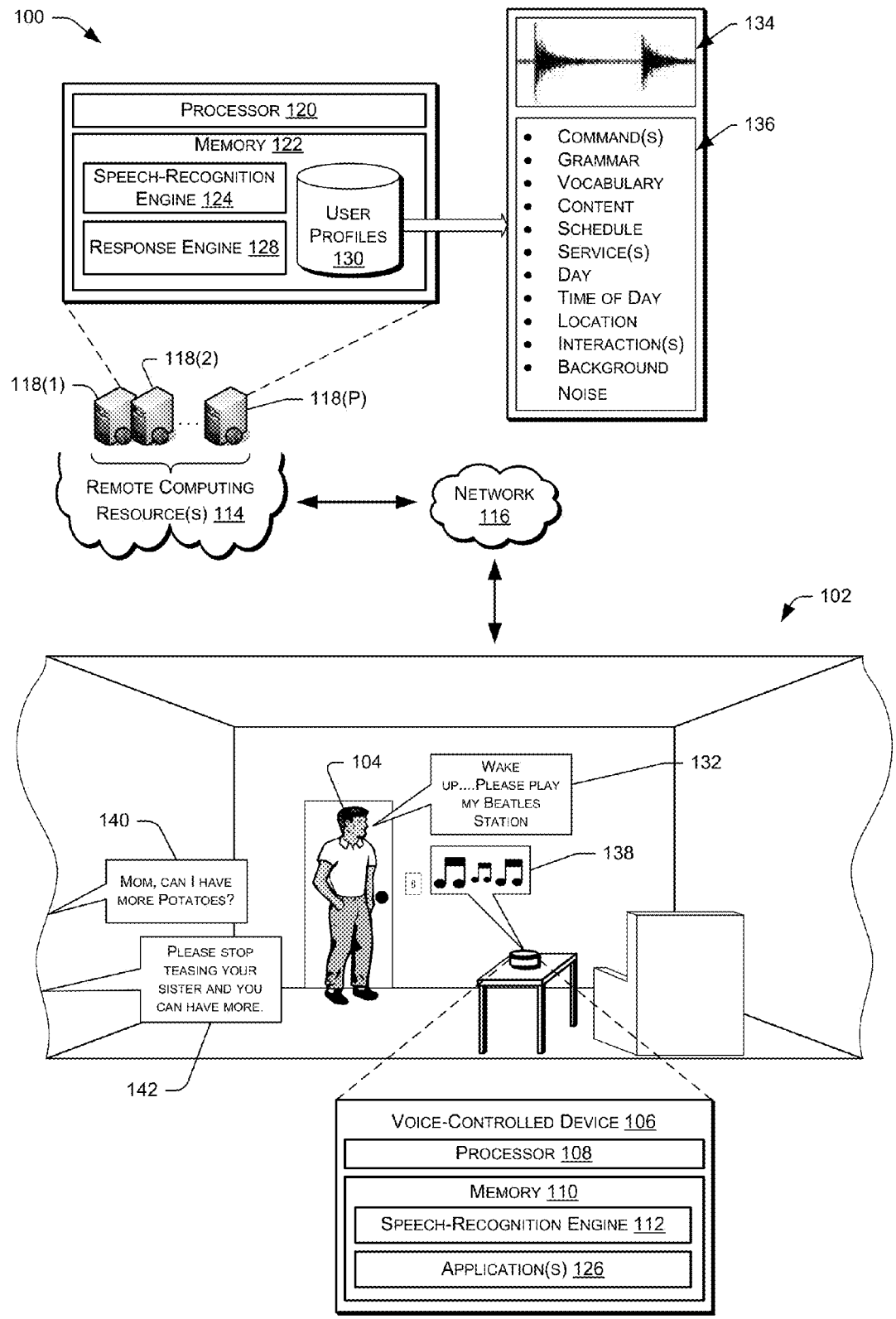
FIG. 1 shows an illustrative voice interaction computing architecture set in a home environment. The architecture includes a voice-controlled device physically situated in the home, along with a user who is uttering a command to the voice-controlled device.

This disclosure describes, in part, techniques for using both speaker-identification information and other characteristics associated with received voice commands to determine how and whether to respond to the received voice commands. As described below, a user may interact with a device through speech by providing one or more voice commands. After beginning an interaction with the user, the device may detect subsequent speech, which may originate from the user, from another user, or from another source (e.g., a television in the background, a radio, etc.). The device may then use speaker-identification information and other characteristics associated with the speech to attempt to determine whether or not the user interacting with the device uttered the speech. The device may then interpret the speech as a valid voice command and may perform a corresponding operation in response to determining that the user did indeed utter the speech. If the device determines that the user did not utter the speech, however, then the device may refrain from taking action on the speech. In some instances, however, the device determines whether the user that uttered the subsequent speech is authorized to instruct the device to perform an action. For instance, envision that the father of a family issues a first voice command and that the device identifies the father as issuing this command. The device may subsequently allow the mother of the family to interact with the device regarding the first command (e.g., pausing music that the father started), while not allowing children in the family to do so.

To provide an example, envision that a first user interacts with a computing device through speech by, for example, providing a voice command requesting that the device play a particular song, make a phone call for the user, purchase an item on behalf of the user, add a reminder to a reminder list, or the like. In response, the device may perform the corresponding operation for the user. For example, the first user may request, via a voice command, to begin playing music on the device or on another device. After the device begins playing the music, the first user may continue to provide voice commands to the device, such as "stop", "next song", "please turn up the volume", and the like.

In response to receiving speech and identifying a potential voice command, however, the device may first ensure that the command is valid. In one example, the device may first ensure that the first user, who initially interacted with the device, is the user providing the voice command. If so, then the device may comply with the command. If not, then the device may refrain from complying with the command, which may include querying the first user or another user to ensure the user's intent and/or to receive authorization to perform the operation from the first user. In another example, the device may determine whether the user that issued the subsequent command is one of a group of one or more users that are authorized to do so.

In the instant example, envision that first user and the device reside within an environment that includes two other users. Furthermore, after the device complies with the first user's command and begins playing music within the environment, the device may identify speech from one or all of the three users. For instance, envision that the device generates an audio signal that includes the second user telling the third user to "remember to stop by the grocery store". The device, or another device, may identify the word "stop" from the audio signal, which if interpreted as a valid voice command may result in the device stopping the playing of the music on the device. Before doing so, however, the device may use both speaker identification and other characteristics to determine whether to respond to the command.

In some instances, the device, or another device, may determine whether the first user issued the command prior to stopping the music in response to identifying the word "stop" from the generated audio signal. To do so, the device may compare a voice signature associated with the first user to a voice signature associated with the received speech ("remember to stop by the grocery store"). A voice signature may uniquely represent a user's voice and may be based on a combination of one or more of a volume (e.g., amplitude, decibels, etc.), pitch, tone, frequency, and the like. Therefore, the device(s) may compare a voice signature of the first user (e.g., computed from the initial voice command to play the music) to a voice signature associated with the received speech. The device(s) may then calculate a similarity of the voice signatures to one another.

In addition, the device(s) may utilize one or more characteristics other than voice signatures to determine whether or not the first user provided the speech and, hence, whether or not to interpret the speech as a valid voice command. For instance, the device may utilize a sequence or choice of words, grammar, time of day, a location within the environment from which speech is uttered, and/or other context information to determine whether the first user uttered the speech "stop . . . " In the instant example, the device(s) may determine, from the speaker-identification information and the additional characteristics, that the first user did not utter the word "stop" and, hence, may refrain from stopping playback of the audio. In addition, the device within the environment may query the first user to ensure the device has made the proper determination. For instance, the device may output the following query: "Did you say that you would like to stop the music?" In response to receiving an answer via speech, the device(s) may again utilize the techniques described above to determine whether or not the first user actually provided the answer and, hence, whether to comply with the user's answer.

The devices and techniques introduced above may be implemented in a variety of different architectures and contexts. One non-limiting and illustrative implementation is described below.

FIG. 1 shows an illustrative voice interaction computing architecture 100 set in a home environment 102 that includes a user 104. The architecture 100 also includes an electronic voice-controlled device 106 with which the user 104 may interact. In the illustrated implementation, the voice-controlled device 106 is positioned on a table within a room of the home environment 102. In other implementations, it may be placed or mounted in any number of locations (e.g., ceiling, wall, in a lamp, beneath a table, under a chair, etc.). Further, more than one device 106 may be positioned in a single room, or one device may be used to accommodate user interactions from more than one room.

Generally, the voice-controlled device 106 has at least one microphone and at least one speaker to facilitate audio interactions with the user 104 and/or other users. In some instances, the voice-controlled device 106 is implemented without a haptic input component (e.g., keyboard, keypad, touch screen, joystick, control buttons, etc.) or a display. In certain implementations, a limited set of one or more haptic input components may be employed (e.g., a dedicated button to initiate a configuration, power on/off, etc.). Nonetheless, the primary and potentially only mode of user interaction with the electronic device 106 may be through voice input and audible output. One example implementation of the voice-controlled device 106 is provided below in more detail with reference to FIG. 6.

The microphone of the voice-controlled device 106 detects audio from the environment 102, such as sounds uttered from the user 104. As illustrated, the voice-controlled device 106 includes a processor 108 and memory 110, which stores or otherwise has access to a speech-recognition engine 112. As used herein, a processor may include multiple processors and/or a processor having multiple cores. The speech-recognition engine 112 performs speech recognition on audio signals generated based on sound captured by the microphone, such as utterances spoken by the user 104. The voice-controlled device 106 may perform certain actions in response to recognizing different speech from the user 104. The user may speak predefined commands (e.g., "Awake"; "Sleep"), or may use a more casual conversation style when interacting with the device 106 (e.g., "I'd like to go to a movie. Please tell me what's playing at the local cinema.").

In some instances, the voice-controlled device 106 may operate in conjunction with or may otherwise utilize computing resources 114 that are remote from the environment 102. For instance, the voice-controlled device 106 may couple to the remote computing resources 114 over a network 116. As illustrated, the remote computing resources 114 may be implemented as one or more servers 118(1), 118(2), . . . , 118(P) and may, in some instances form a portion of a network-accessible computing platform implemented as a computing infrastructure of processors, storage, software, data access, and so forth that is maintained and accessible via a network such as the Internet. The remote computing resources 114 do not require end-user knowledge of the physical location and configuration of the system that delivers the services. Common expressions associated for these remote computing devices 114 include "on-demand computing", "software as a service (SaaS)", "platform computing", "network-accessible platform", "cloud services", "data centers", and so forth.

The servers 118(1)-(P) include a processor 120 and memory 122, which may store or otherwise have access to some or all of the components described with reference to the memory 110 of the voice-controlled device 106. For instance, the memory 122 may have access to and utilize a speech-recognition engine 124 for receiving audio signals from the device 106, recognizing speech and, potentially, causing performance of an action in response. In some examples, the voice-controlled device 106 may upload audio data to the remote computing resources 114 for processing, given that the remote computing resources 114 may have a computational capacity that far exceeds the computational capacity of the voice-controlled device 106. Therefore, the voice-controlled device 106 may utilize the speech-recognition engine 124 at the remote computing resources 114 for performing relatively complex analysis on audio captured from the environment 102.

Regardless of whether the speech recognition occurs locally or remotely from the environment 102, the voice-controlled device 106 may receive vocal input from the user 104 and the device 106 and/or the resources 114 may perform speech recognition to interpret a user's operational request or command. The requests may be for essentially any type of operation, such as database inquires, requesting and consuming entertainment (e.g., gaming, finding and playing music, movies or other content, etc.), personal management (e.g., calendaring, note taking, etc.), online shopping, financial transactions, and so forth. In some instances, the device 106 also interacts with a client application stored on one or more client devices of the user 104. In some instances, the user 104 may also interact with the device 104 through this "companion application". For instance, the user 104 may utilize a graphical user interface (GUI) of the companion application to make requests to the device 106 in lieu of voice commands. Additionally or alternatively, the device 106 may communicate with the companion application to surface information to the user 104, such as previous voice commands provided to the device 106 by the user (and how the device interpreted these commands), content that is supplementary to a voice command issued by the user (e.g., cover art for a song playing on the device 106 as requested by the user 104), and the like. In addition, in some instances the device 106 may send an authorization request to a companion application in response to receiving a voice command, such that the device 106 does not comply with the voice command until receiving permission in the form of a user response received via the companion application.

The voice-controlled device 106 may communicatively couple to the network 116 via wired technologies (e.g., wires, USB, fiber optic cable, etc.), wireless technologies (e.g., WiFi, RF, cellular, satellite, Bluetooth, etc.), or other connection technologies. The network 116 is representative of any type of communication network, including data and/or voice network, and may be implemented using wired infrastructure (e.g., cable, CAT5, fiber optic cable, etc.), a wireless infrastructure (e.g., WiFi, RF, cellular, microwave, satellite, Bluetooth, etc.), and/or other connection technologies.

As illustrated, the memory 110 of the voice-controlled device 106 also stores or otherwise has access to the speech-recognition engine 112 and one or more applications 126. The applications may comprise an array of applications, such as an application to allow the user 104 to make and receive telephone calls at the device 106, a media player configured to output audio in the environment via a speaker of the device 106, or the like. In some instances, the device 106 utilizes applications stored remotely from the environment 102 (e.g., web-based applications).

The memory 122 of the remote computing resources 114, meanwhile, may store a response engine 128 in addition to the speech-recognition engine 124. The response engine 128 may determine how to respond to voice commands uttered by users within the environment 102, as identified by the speech-recognition engine 124 (or the speech-recognition engine 112). In some instances, the response engine 128 may reference one or more user profiles 130 to determine whether and how to respond to speech that includes a potential valid voice command, as discussed in further detail below.

In the illustrated example, the user 104 issues the following voice command 132: "Wake up . . . . Please play my Beatles station". In this example, the speech-recognition engine 112 stored locally on the device 106 is configured to determine when a user within the environment utters a predefined utterance, which in this example is the phrase "wake up". In response to identifying this phrase, the device 106 may begin providing (e.g., streaming) generated audio signals to the remote computing resources to allow the speech-recognition engine 124 to identify valid voice commands uttered in the environment 102. As such, after identifying the phrase "wake up" spoken by the user 104, the device may provide the subsequently generated audio signals to the remote computing resources 114 over the network 116

In response to receiving the audio signals, the speech-recognition engine 124 may identify the voice command to "play" the user's "Beatles station". In some instances, the response engine 128 may perform speech identification or other user-identification techniques to identify the user 104 to allow the engine 128 to identify the appropriate station. To do so, the response engine 128 may reference the user profile database 130. As illustrated, each user profile may be associated with a particular voice signature 134 and one or more characteristics 136 in addition to the voice signature.

For instance, if the response engine 128 attempts to identify the user, the engine 128 may compare the audio to the user profile(s) 130, each of which is associated with a respective user. Each user profile may store an indication of the voice signature 134 associated with the respective user based on previous voice interactions between the respective user and the voice-controlled device 106, other voice-controlled devices, other voice-enabled devices or applications, or the respective user and services accessible to the device (e.g., third-party websites, etc.). In addition, each of the profiles 130 may indicate one or more other characteristics 136 learned from previous interactions between the respective user and the voice-controlled device 106, other voice-controlled devices, or other voice-enabled devices or applications. For instance, these characteristics may include:

commands often or previously issued by the respective user;

command sequences often or previously issued by the respective user;

grammar typically used by the respective user (i.e., common phrases used by a user, common patterns of words spoken by a user, etc.);

a vocabulary typically used by the respective user;

a language spoken by the respective user;

a pronunciation of certain words spoken by the respective user;

content to which the respective user has access and/or content that the respective user often requests;

a schedule associated with the respective user, either learned over time or determined with reference to a calendaring application associated with the respective user;

third-party services that the respective user has registered with (e.g., music services, shopping services, email account services, etc.);

days on which the respective user often issues voice commands or is otherwise present in the environment;

times of day at which the respective user often issues voice commands or is otherwise present in the environment;

a location of the respective user when the voice-controlled device 106 captures the audio (e.g., obtained via a GPS location of a client device associated with the user);

previous interactions between the respective user and the voice-controlled device 106, other voice-controlled devices, or other voice-enabled devices or applications;

background noise that commonly exists when the respective user interacts with the voice-controlled device 106 (e.g., certain audio files, videos, television shows, cooking sounds, etc.); or devices frequently detected (e.g., via WiFi) in the presence of the respective user.

Of course, while a few examples have been listed, it is to be appreciated that the techniques may utilize multiple other similar or different characteristics when attempting to identify the user 104 that utters a command. For instance, the response engine 128 may reference which users have recently interacted with the device 106 in determining which user is likely currently interacting with the device. The amount of influence this factor has in determining which user is interacting with the device 106 may decay over time. For instance, if one minute ago a particular user made a request to the device, then the device may weight this interaction more greatly than if the interaction was ten minutes prior. Furthermore, in some instances, multiple user profiles may correspond to a single user. Over time, the response engine 128 may map each of the multiple profiles to the single user, as the device 106 continues to interact with the particular user.

After identifying the user 104, the response engine 128 may, in this example, begin providing the requested audio (the user's Beatles station) to the device 106, as represented at 138. The engine 128 may obtain this audio locally or remotely (e.g., from an audio or music service). Thereafter, the user 104 and/or other users may provide subsequent commands to the voice-controlled device. In some instances, only the user 104 and/or a certain subset of other users may provide voice commands that are interpreted by the device to represent valid voice commands that the device 106 will act upon. In some instances, the user(s) that may provide voice commands to which the device 106 will act upon may be based on the requested action. For instance, all users may be authorized to raise or lower volume of music on the device 106, while only a subset of users may be authorized to change the station being played. In some instances, an even smaller subset of users may be authorized to purchase items through the device 106 or alter an ongoing shopping or purchase process using the device 106.

Therefore, as the speech-recognition engine 124 identifies speech from within audio signals received from the device 106, the response engine 128 may determine whether the speech comes from the user 104 based on a voice signature and/or one or more other characteristics. In one example, the response engine 128 may perform an operation requested by the speech in response to determining that the user 104 uttered the speech. If, however, the engine 128 determines that the user 104 did not utter the speech, the engine 128 may refrain from performing the action.

FIG. 1, for instance, illustrates two users in an adjacent room having a conversation. A first user of the two users states the following question at 140: "Mom, can I have some more potatoes?" A second user of the two responds, at 142, stating: "Please stop teasing your sister and you can have more." The microphone(s) of the device 106 may capture this sound, generate a corresponding audio signal, and upload the audio signal to the remote computing resources 114. In response, the speech-recognition engine 124 may identify the word "stop" from the audio signal. Before stopping the playback of the audio at the device 106, however, the response engine 128 may determine whether the user that stated the word "stop" is the same as the user that issued the initial command to play the music at the device 106. For instance, the response engine 128 may compare a voice signature of the speech at 142 to a voice signature associated with the command 132 and/or to a voice signature of the user 104.

In addition, the response engine 128 may utilize one or more characteristics other than the voice signatures to determine whether to interpret the speech as a valid voice command. For instance, the response engine 128 may reference any of the items listed above. For example, the response engine 128 may reference, from the profile associated with the user 104, a grammar usually spoken by the user 104 and may compare this to the grammar associated with the speech 142. If the grammar of the speech 142 generally matches the grammar usually spoken by the user 104, then response engine 128 may increase the likelihood that it will perform an operation associated with the command (e.g., will stop playback of the audio). Grammar may include phrases spoken by a user, common word patterns spoken by a user, words often selected by a user from synonyms of the word (e.g., "aint" vs. "isn't"), and the like.

The response engine 128 may also reference the words around the potential voice command to determine whether the command was indeed intended for the device 106, without regard to whether or not the user 104 uttered the speech 142. In this example, for instance, the engine 128 may identify, from the words surrounding the word "stop," that the user uttering the command was not speaking to the device 106.

Additionally or alternatively, the response engine 128 may compare any of the characteristics associated with the speech 142 to corresponding characteristics associated with the user 104, such as:

commands often or previously issued by the user 104;
command sequences often or previously issued by the user 104;
a vocabulary typically used by the user 104;
a language typically spoken by the user 104;
a pronunciation of certain words spoken by the user 104;
content to which the user 104 has access and/or content that the respective user often requests;
a schedule associated with the user 104, either learned over time or determined with reference to a calendaring application associated with the user 104;
third-party services that the user 104 has registered with (e.g., music services, shopping services, email account services, etc.);
times of day at which the user 104 often issues voice commands or is otherwise present in the environment;
a location of the user 104 within the environment 102 when the voice-controlled device 106 captured the speech versus a location from which the speech 142 originates (e.g., determined by time-of-flight (ToF) or beamforming techniques);
previous interactions between the user 104 and the voice-controlled device 106, other voice-controlled devices, or other voice-enabled devices or applications; or
devices frequently detected (e.g., via WiFi) in the presence of the user 104.

Of course, while a few examples have been listed, it is to be appreciated that any other characteristics associated with the speech 142 may be used to determine whether the user 104 uttered the speech 142.

Figure 2:
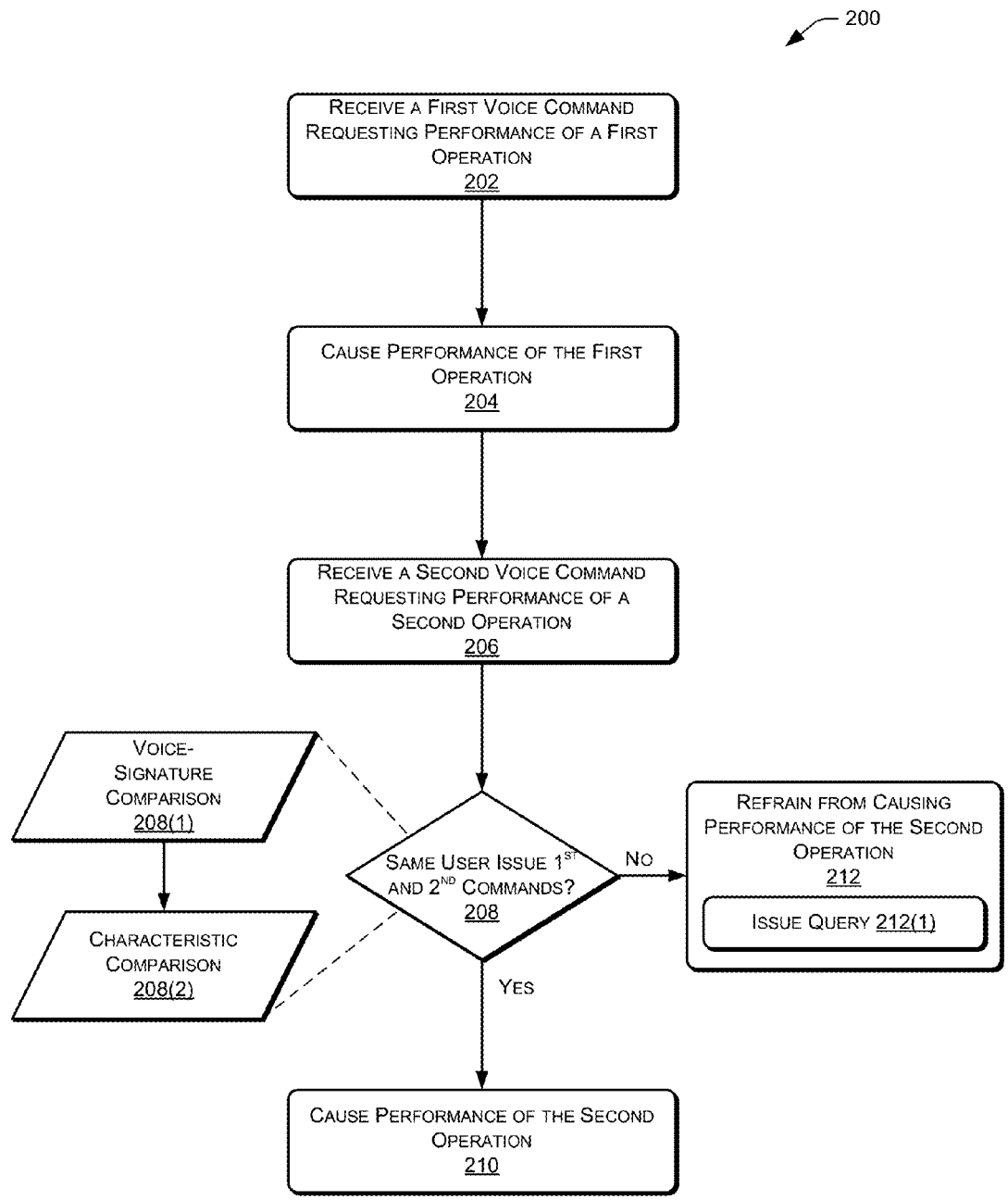
FIG. 2 depicts a flow diagram of an example process for performing a first operation in response to receiving a voice command from a user, receiving a second voice command, and performing a second operation in response to determining that the user that uttered the first voice command also uttered the second voice command.

FIG. 2 depicts a flow diagram of an example process 200 for performing a first operation in response to receiving a voice command from a user, receiving a second voice command, and performing a second operation in response to determining that the user that uttered the first voice command also uttered the second voice command. The process 200 (as well as each process described herein) may be performed in whole or in part by the device 106, the remote computing resources 114, and/or by any other computing device(s). In addition, each process is illustrated as a logical flow graph, each operation of which represents a sequence of operations that can be implemented in hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The process 200 includes, at 202, receiving a first voice command requesting performance of a first operation. As described above, the first voice command may request performance of any type of operation, such as making a telephone call, playing an audio file, adding an item to list, or the like. At 204, and in response, the process 200 causes performance of the first operation. At 206, the process 200 receives a second voice command requesting performance of a second operation. In response, the process 200 determines, at 208, whether the user that issued the second voice command is the same as the user that issued the first voice command.

In some instances, the process 200 may make this determination with reference to a voice signature comparison 208(1) and a comparison 208(2) of one or more other characteristics. As described above, the voice signature of the first and second commands may based, respectively, on the volume, frequency, tone, pitch, or the like of the respective command. In some instances, the process of making this voice signature comparison includes first extracting features from the first voice command to form the initial voice signature or "voice print". Thereafter, the second voice command may be compared to the previously created voice print. In some instances, a voice print may be compared to a previously created voice print(s) that occurred in a same session (i.e., one unit of speech may be compared to another unit of speech just uttered). Technologies used to process and store voice prints include frequency estimation, hidden Markov models, Gaussian mixture models, pattern matching algorithms, neural networks, cepstral mean subtraction (CMS), cepstral variance normalization (CVN), random forest classifiers, matrix representation, Vector Quantization, decision trees, cohort models, and world models. In some instances, a voice print may be derived by a joint-factor analysis (JFA) technique, an I-vector approach (based on a JFA), from a cMLLR, from a vocal tract length normalization warping factor, or the like.

In some instances, certain factors associated with a user's utterance are used to determine which speech features to focus on when attempting to identify a user based on an utterance of the user. These features may include a length of a user's utterance, a signal-to-noise (SNR) ratio of the utterance, a desired tradeoff between precision and robustness, and the like. For instance, a warping factor associated with the user utterance may be used more heavily to perform identification when a user's utterance is fairly short, whereas a cMLLR matrix may be utilized for longer utterances.

The characteristic comparison 208(2), meanwhile, may include comparing a grammar of the first command (or of an identified user associated with the first command) to a grammar of the second command, a location in an environment from which the first command was uttered to a location within the environment from which the second command was uttered, and/or the like. This characteristic may, therefore, include determine how similar a grammar of the first command is to a grammar of the second command (e.g., expressed in a percentage based on a number of common words, a number of words in the same order, etc.).

If the process 200 determines that the same user issued both the first and second commands, then at 210 the process 200 causes performance of the second operation. In some instances, the process 200 makes this determination if the likelihood (e.g., based on the voice-signature comparison 208(1) and the characteristic comparison 208(2)) is greater than a certain threshold. If, however, the process 200 determines that the same user did not issue the first and second commands, then the process 200 may refrain from causing performance of the operation at 212. This may further include taking one or more actions, such as querying, at 212(1), a user within the environment as to whether the user would indeed like to perform the second operation. If a user provides an affirmative answer, the process 200 may again determine whether the user that issued the answer is the same as the user that uttered the first voice command and, if so, may perform the operation. If not, however, then the process 200 may again refrain from causing performance of the operation. In another example, the process 200 may issue the query or request to authorize the performance of the second voice command to a device or application associated with the user that issued the first voice command. For instance, the process 200 may issue such a query or request to the "companion application" of the user described above (which may execute on a tablet computing device of the user, a phone of the user, or the like).

Figure 3:
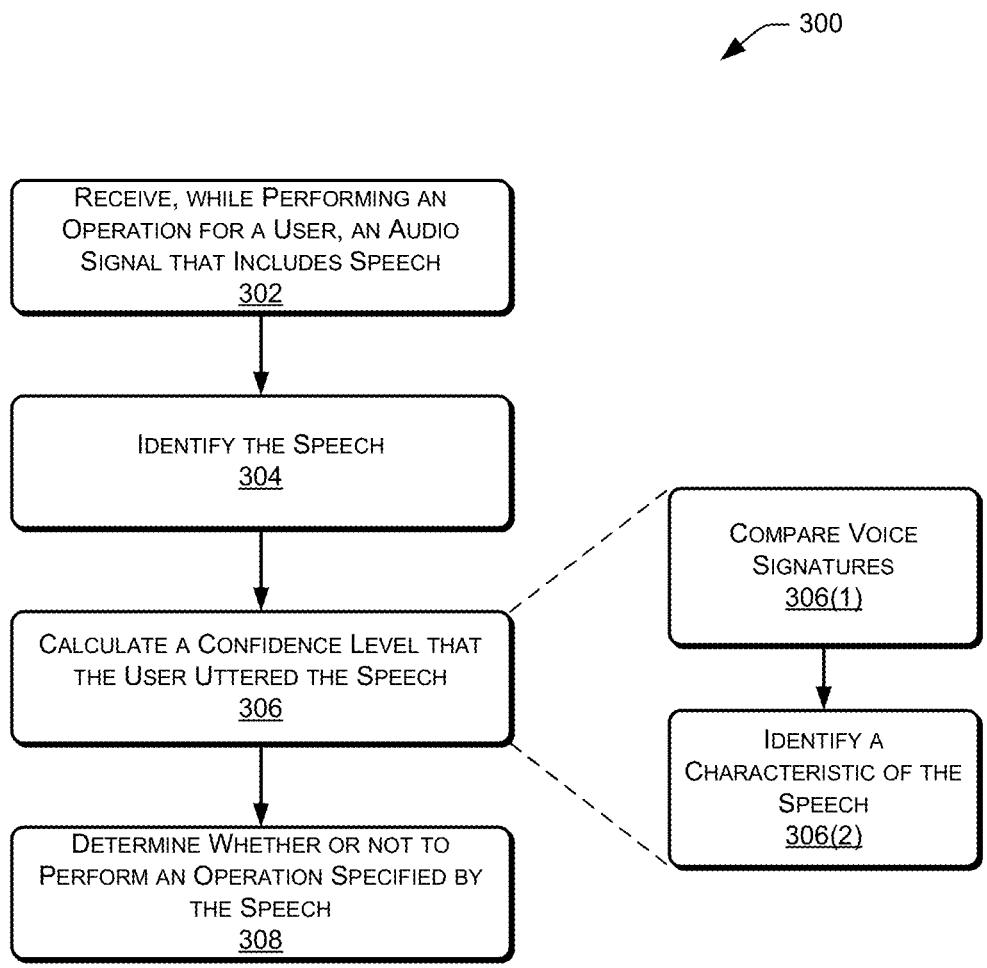
FIG. 3 depicts a flow diagram of an example process for receiving speech while performing an operation for a user and determining whether to perform another operation specified by the speech based on a confidence level regarding whether or not the user uttered the speech.

FIG. 3 depicts a flow diagram of an example process 300 for receiving speech while performing an operation for a user and determining whether to perform another operation specified by the speech based on a confidence level regarding whether or not the user uttered the speech. At 302, the process 300 receives, while performing an operation for a user, an audio signal that includes speech. At 304, the process 300 identifies the speech from within the audio signal. At 306, the process 300 calculates a confidence level that the user uttered the speech. As illustrated, this may include comparing, at 306(1), a voice signature associated with the user to a voice signature of the speech and comparing, at 306(2), a characteristic associated with the user to a characteristic associated with the speech. At 308, the process 300 may determine whether or not to perform an operation specified by the speech based at least in part on the confidence level. For instance, the process 300 may perform the operation if the confidence level is greater than a threshold and otherwise may refrain from performing the operation. As used herein, a confidence level denotes any metric for representing a likelihood that a particular user uttered a particular piece of speech. This may be represented as a percentage, a percentile, a raw number, a binary decision, or in any other manner.

Figure 4:
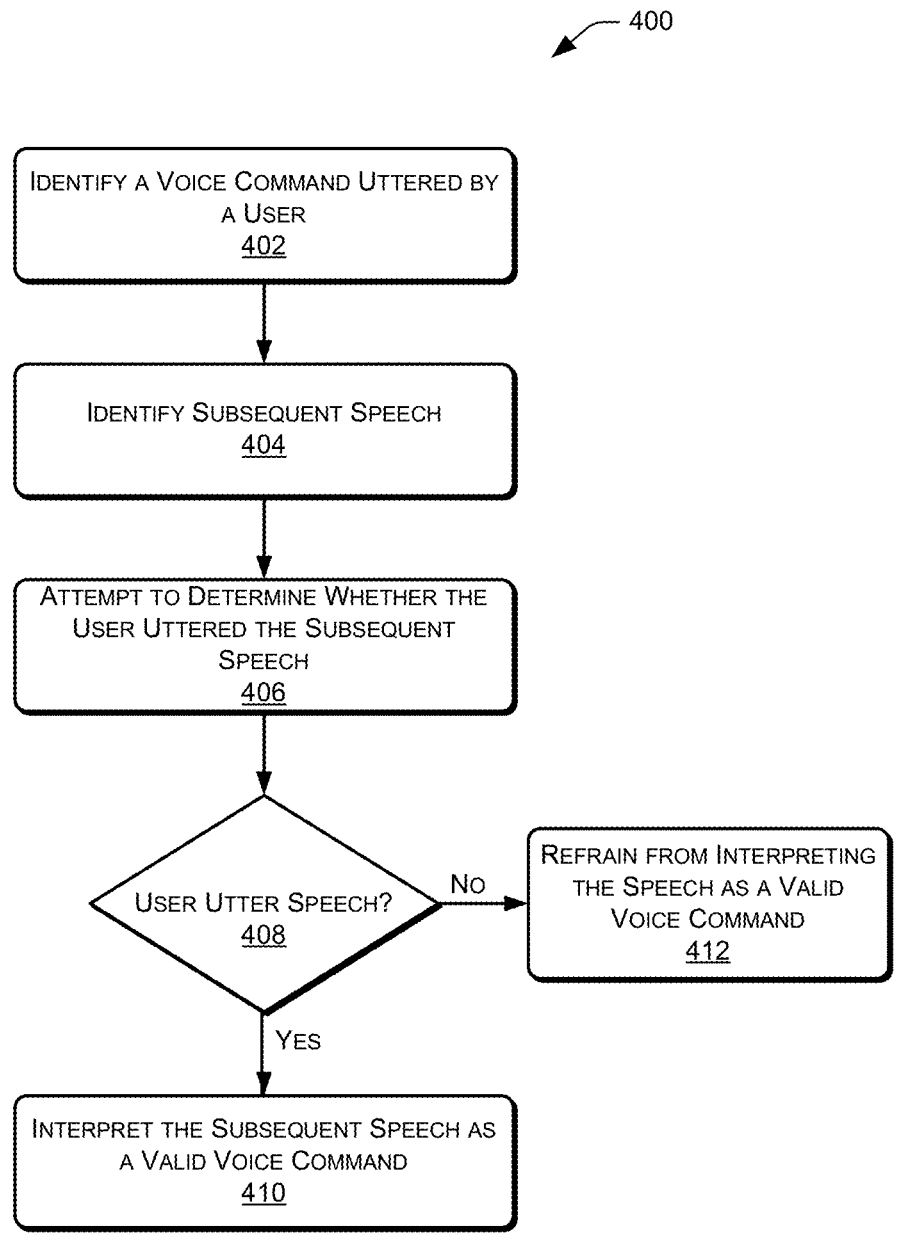
FIG. 4 depicts a flow diagram of an example process for determining whether or not to interpret speech as a valid voice command based on whether a user that utters the speech is the same as a user that uttered a prior voice command.

FIG. 4 depicts a flow diagram of an example process 400 for determining whether or not to interpret speech as a valid voice command based on whether a user that utters the speech is the same as a user that uttered a prior voice command. At 402, the process 400 identifies a voice command uttered by a user. At 404, the process 400 identifies speech that is subsequent to the voice command. At 406, the process 400 attempts to determine whether the user that uttered the voice command also uttered the subsequent speech. At 408, the process 408 makes a determination based on 406. If the process 400 determines that the user did in fact utter the speech, then the process 400 may interpret the speech as a valid voice command at 410. If the process 400 determines that the user did not utter the speech, however, then at 412 the process 400 may refrain from interpreting the speech as a valid voice command.

In some instances, the process 400 may additionally identify the user that uttered the subsequent speech and may attempt to communicate with this user to determine whether or not to perform an action associated with this speech. For instance, the process 400 may output audio directed to the user or may provide a communication to a device or application (e.g., a companion application) associated with the user that uttered the subsequent speech to determine whether or not to perform an operation corresponding to this subsequent speech.

Figure 5:
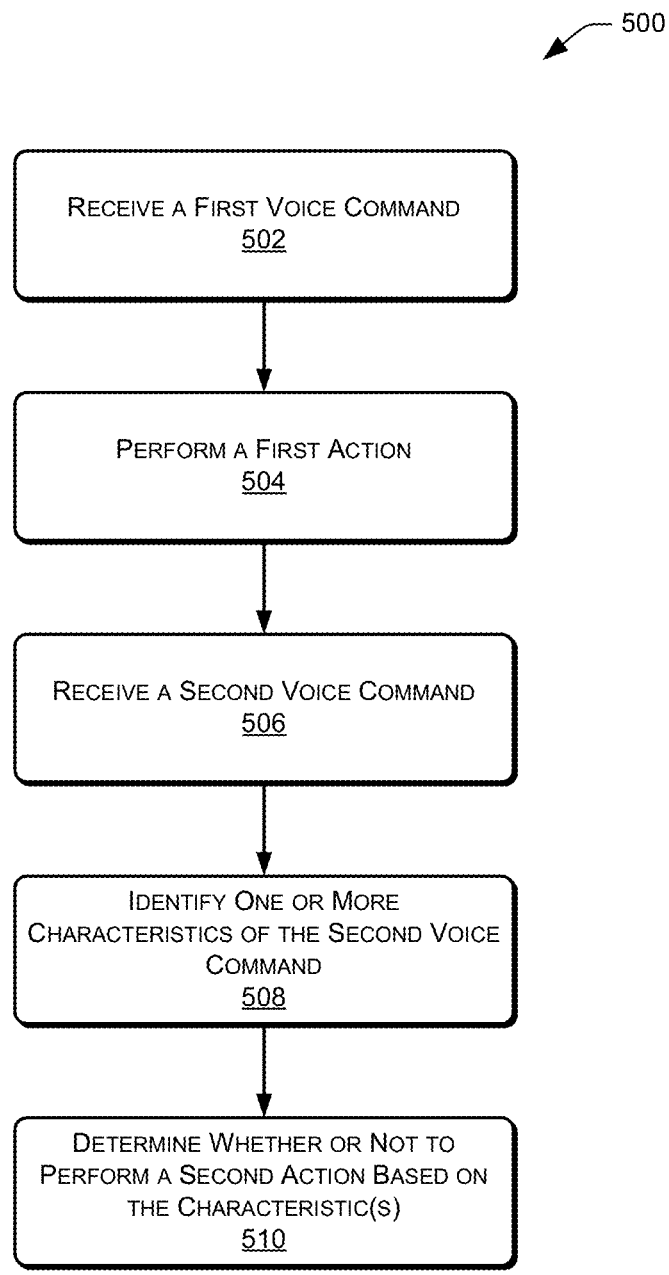
FIG. 5 depicts a flow diagram of an example process for receiving a first voice command, performing a first action in response, and determining whether or not to perform a second action associated with a second voice command based on a characteristic of the second action and/or the second voice command.

FIG. 5 depicts a flow diagram of an example process 500 for receiving a first voice command, performing a first action in response, and determining whether or not to perform a second action associated with a second voice command based on a characteristic of the second action and/or the second voice command.

At 502, the process 500 receives a first voice command uttered by a user within an environment. For instance, the user may utter a request that the voice-controlled device 106 of FIG. 1 play a particular song or music station. At 504, the process 500 performs a first action at least in partly in response to receiving the first voice command. For instance, the process 500 may instruct the device 106 to play the requested song or station. At 506, the process 500 receives a second voice command uttered within the environment, the second voice command requesting performance of a second action that is related to the first action. This action may include, in the instant example, turning up the volume, changing the music station, purchasing a song currently being played, or the like.

At 508, the process 500 identifies one or more characteristics associated with the second voice command, the second action, or both and, at 510, the process determines whether or not to perform the second action based at least in part on the characteristic(s). For instance, the process 500 may determine whether the user that uttered the second voice command is the same as the user that uttered the first voice command, and may perform the action if so, while refraining from performing the action if not. In another example, the process 500 may identify the user that uttered the second command and determine whether this user is one of a group of one or more users authorized to cause performance of the second action. For instance, certain members of a family may be allowed to purchase music via the voice-controlled device, while others may not be. In another example, the process 500 may simply determine whether the user that uttered the second voice command is known or recognized by the system—that is, whether the user can be identified. If so, then the process 500 may cause performance of the second action, while refraining from doing so if the user is not recognized. In another example, the characteristic may simply be associated with the action itself. For instance, if the second action is turning down the volume on the device 106, then the process 500 may perform the action regardless of the identity of the user that issues the second command.

Figure 6:
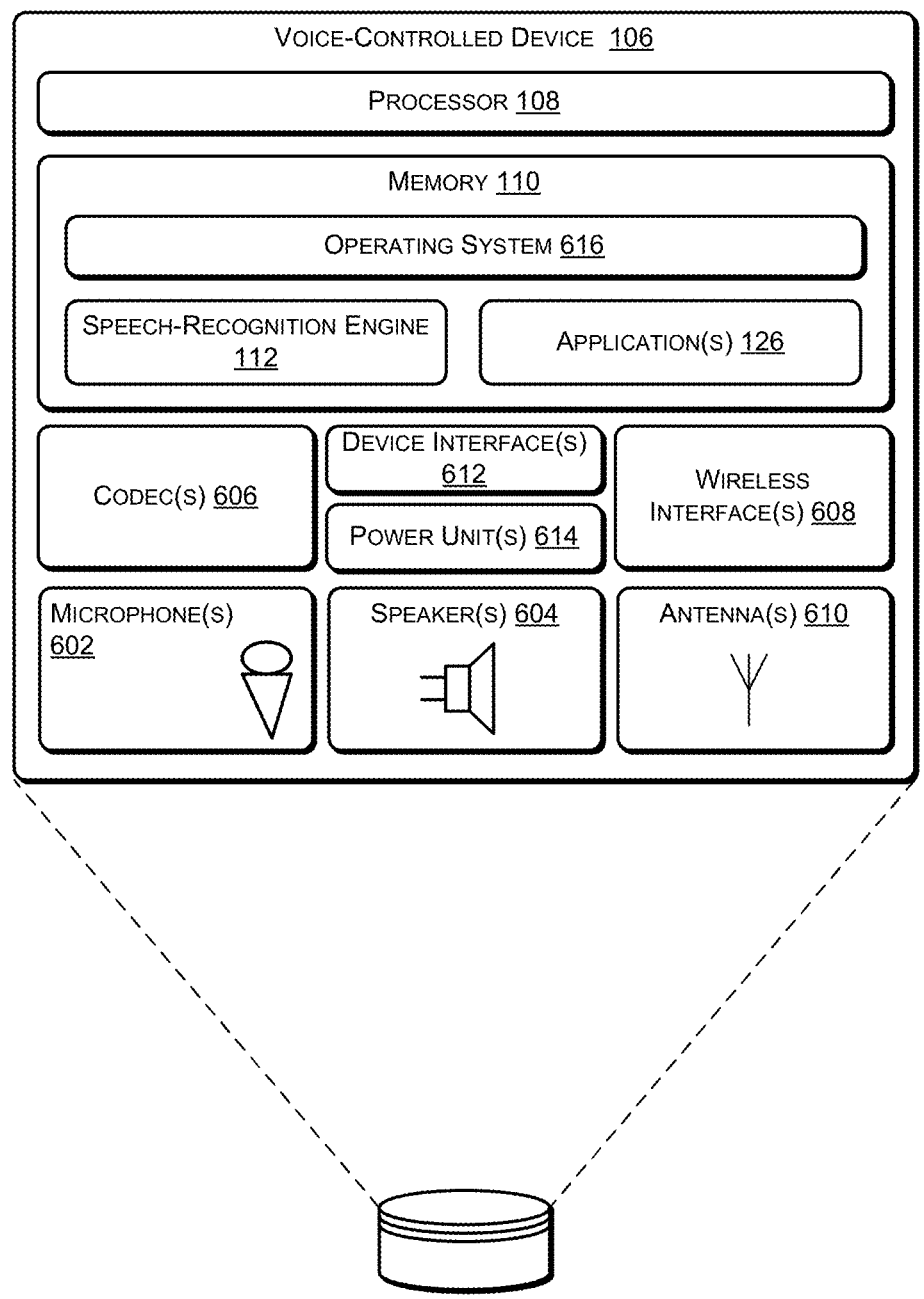
FIG. 6 shows a block diagram of selected functional components implemented in the voice-controlled device of FIG. 1.

FIG. 6 shows selected functional components of one implementation of the voice-controlled device 106 in more detail. Generally, the voice-controlled device 106 may be implemented as a standalone device that is relatively simple in terms of functional capabilities with limited input/output components, memory and processing capabilities. For instance, the voice-controlled device 106 does not have a keyboard, keypad, or other form of mechanical input in some implementations, nor does it have a display or touch screen to facilitate visual presentation and user touch input. Instead, the device 106 may be implemented with the ability to receive and output audio, a network interface (wireless or wire-based), power, and limited processing/memory capabilities.

In the illustrated implementation, the voice-controlled device 106 includes the processor 108 and memory 110. The memory 110 may include computer-readable storage media ("CRSM"), which may be any available physical media accessible by the processor 108 to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor 108.

The voice-controlled device 106 includes a microphone unit that comprises one or more microphones 602 to receive audio input, such as user voice input. The device 106 also includes a speaker unit that includes one or more speakers 604 to output audio sounds. One or more codecs 606 are coupled to the microphone(s) 602 and the speaker(s) 604 to encode and/or decode the audio signals. The codec may convert audio data between analog and digital formats. A user may interact with the device 106 by speaking to it, and the microphone(s) 602 captures sound and generates an audio signal that includes the user speech. The codec(s) 606 encodes the user speech and transfers that audio data to other components. The device 106 can communicate back to the user by emitting audible statements through the speaker(s) 604. In this manner, the user interacts with the voice-controlled device simply through speech, without use of a keyboard or display common to other types of devices.

In the illustrated example, the voice-controlled device 106 includes one or more wireless interfaces 608 coupled to one or more antennas 610 to facilitate a wireless connection to a network. The wireless interface(s) 608 may implement one or more of various wireless technologies, such as wifi, Bluetooth, RF, and so on.

One or more device interfaces 612 (e.g., USB, broadband connection, etc.) may further be provided as part of the device 106 to facilitate a wired connection to a network, or a plug-in network device that communicates with other wireless networks. One or more power units 614 are further provided to distribute power to the various components on the device 106.

The voice-controlled device 106 is designed to support audio interactions with the user, in the form of receiving voice commands (e.g., words, phrase, sentences, etc.) from the user and outputting audible feedback to the user. Accordingly, in the illustrated implementation, there are no or few haptic input devices, such as navigation buttons, keypads, joysticks, keyboards, touch screens, and the like. Further there is no display for text or graphical output. In one implementation, the voice-controlled device 106 may include non-input control mechanisms, such as basic volume control button(s) for increasing/decreasing volume, as well as power and reset buttons. There may also be one or more simple light elements (e.g., LEDs around perimeter of a top portion of the device) to indicate a state such as, for example, when power is on or to indicate when a command is received. But, otherwise, the device 106 does not use or need to use any input devices or displays in some instances.

Several modules such as instruction, datastores, and so forth may be stored within the memory 110 and configured to execute on the processor 108. An operating system module 616 is configured to manage hardware and services (e.g., wireless unit, Codec, etc.) within and coupled to the device 106 for the benefit of other modules.

In addition, the memory 110 may include the speech-recognition engine 112 and the application(s) 126. In some instances, some or all of these engines, data stores, and components may reside additionally or alternatively at the remote computing resources 114.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. One or more computing devices comprising:
one or more processors; and
one or more computer-readable media storing computer-executable instructions that, when executed by the one or more processors, cause the one or more processors to perform acts comprising:
receiving a first audio signal generated by a microphone of a device residing within an environment, the first audio signal including a first voice command from a first user within the environment, the first voice command comprising a first request that the device perform a first operation, the first voice command being associated with a first voice signature;
causing the device to perform the first operation at least partly in response to receiving the first voice command;
receiving, while the device is performing the first operation, a second audio signal generated by the microphone of the device, the second audio signal including a second voice command comprising a second request that the device perform a second operation related to the first operation being performed by the device, the second voice command being associated with a second voice signature;
calculating a similarity between the first voice signature and the second voice signature to determine that the first user uttered the second voice command or that a user within the environment other than the first user uttered the second voice command;
causing performance of the second operation at least partly in response to determining that the first user uttered the second voice command; and
refraining from causing performance of the second operation at least partly in response to determining that a user within the environment other than the first user uttered the second voice command.

2. One or more computing devices as recited in claim 1, the acts further comprising identifying a characteristic, other than the voice signature of the second voice command, associated with the second voice command, and wherein determining to cause performance of the second operation or refrain from causing performance of the second operation is based at least in part on comparing the characteristic to a characteristic associated with the first voice command.

3. One or more computing devices as recited in claim 2, wherein the characteristic comprises one or more of: a grammar of the second voice command or a time of day at which the second voice command is uttered.

4. One or more computing devices as recited in claim 1, wherein the calculating comprises at least one of comparing a volume of the first voice command to a volume of the second voice command or comparing a frequency of the first voice command to a frequency of the second voice command.

5. One or more computing devices as recited in claim 1, the acts further comprising issuing a query regarding whether or not to perform the second operation after determining to refrain from causing performance of the second operation.

6. One or more computing devices as recited in claim 1, wherein the first and second voice signatures are based at least in part on at least one of a volume or frequency of the respective voice commands.

7. One or more non-transitory computer-readable media storing computer-executable instructions that, when executed by one or more processors, cause the one or more processors to perform acts comprising:
receiving a first audio signal generated by a microphone of a device residing within an environment, the first audio signal representing first speech requesting that the device perform a first operation, the first speech associated with a first voice signature;
performing speech recognition on the first audio signal to identify the first speech;
causing the device to perform the first operation;
receiving a second audio signal generated by the microphone of the device, the second audio signal representing second speech uttered while the device performs the first operation, the second speech requesting that the device perform a second operation related to the first operation being performed by the device, the second speech associated with a second voice signature;
performing speech recognition on the second audio signal to identify the second speech;
calculating a confidence level that a user that uttered the first speech also uttered the second speech based, at least in part, on the first voice signature and the second voice signature;
determining that the user uttered the second speech based at least in part on the calculated confidence level; and
causing the device to perform the second operation, specified by the second speech, at least partly in response to determining that the user uttered the second speech.

8. One or more non-transitory computer-readable media as recited in claim 7, wherein the second voice signature associated with the second speech is based at least in part on at least one of a volume or frequency of the second speech and the first voice signature is based at least in part on at least one of a volume or frequency of previous speech uttered by the user.

9. One or more non-transitory computer-readable media as recited in claim 8, the acts further comprising identifying a characteristic, other than the second voice signature associated with the second speech, and wherein the calculating further comprises calculating the confidence level with reference to the characteristic.

10. One or more non-transitory computer-readable media as recited in claim 9, wherein calculating the confidence level with reference to the characteristic comprises calculating a similarity between the characteristic and a corresponding characteristic associated with the user.

11. One or more non-transitory computer-readable media as recited in claim 9, wherein the characteristic comprises a grammar of the second speech, and the calculating includes comparing a similarity between the grammar and a grammar of one or more previous voice commands spoken by the user.

12. One or more non-transitory computer-readable media as recited in claim 9, wherein the characteristic comprises a location within the environment from which the second speech was uttered, and the calculating includes comparing a similarity between the location and a location within the environment from which the user uttered a previous voice command.

13. A method comprising: under control of one or more computing devices configured with executable instructions,
receiving a first audio signal generated by a microphone of a device residing in an environment;
identifying, from the audio signal, a voice command uttered by a user in the environment;
causing the device to perform a first operation specified by the voice command;
identifying, from a subsequent audio signal generated by the microphone of the device, subsequent speech uttered within the environment at least partly while the device performs the first operation, the subsequent speech requesting that the device perform a second operation related to the first operation;
determining whether that the user uttered the subsequent speech or whether that another user in the environment uttered the subsequent speech;
interpreting the subsequent speech as a valid voice command at least partly in response to determining that the user uttered the subsequent speech; and
refraining from interpreting the subsequent speech as a valid voice command at least partly in response to determining that another user in the environment uttered the subsequent speech.

14. A method as recited in claim 13, further comprising:
identifying a user that uttered the subsequent speech; and
communicating with the user that uttered the subsequent speech regarding whether or not to perform an action associated with the subsequent speech.

15. A method as recited in claim 14, wherein the communicating comprises causing output of audio directed to the user that uttered the subsequent speech or sending a communication to a device or application associated with the user that uttered the subsequent speech.

16. A method as recited in claim 13, wherein the first voice signature is based at least in part on a volume or frequency of the voice command.

17. A method as recited in claim 16, wherein the first voice signature is based at least in part on a volume or frequency of the voice command and the second voice signature is based at least in part on a volume or frequency of the subsequent speech.

18. A method as recited in claim 13, wherein the attempting comprises:
identifying a characteristic associated with the subsequent speech and comparing the characteristic to a known characteristic associated with the user.

19. A method as recited in claim 18, wherein the characteristic comprises a grammar of the subsequent speech, a choice of words of the subsequent speech, or a location within the environment from which the subsequent speech was uttered.

20. A method as recited in claim 13, wherein the attempting comprises comparing past voice commands uttered by the user to one or more characteristics associated with the subsequent speech.

21. A method comprising:
under control of one or more computing devices configured with executable instructions,
receiving a first audio signal generated by a microphone of a device residing within an environment, the first audio signal including a first voice command uttered by a first user in the environment, the first voice command requesting that the device perform a first action, the first voice command associated with a first voice signature;
causing the device to perform the first action at least partly in response to receiving the first voice command;
receiving, while the device performs the first action, a second audio signal generated by the microphone of the device, the second audio signal including a second voice command uttered within the environment, the second voice command requesting that the device perform a second action that is related to the first action, the second voice command associated with a second voice signature;
determining that the first user uttered the second voice command or that a user within the environment other than the first user uttered the second voice command based, at least in part, on the first voice signature and the second voice signature; and
determining whether or not to perform the second action based at least in part on whether the first user uttered the second voice command or whether a user within the environment other than the first user uttered the second voice command.

22. A method as recited in claim 21, further comprising determining that a user that uttered the second voice command is included in a group of one or more users authorized to cause performance of the second action.

23. A method as recited in claim 21, further comprising determining whether or not a user that uttered the second voice command is recognized to the one or more computing devices, and the determining whether or not to perform the second action is also based at least in part on whether or not the user that uttered the second voice command is recognized.

* * * * *